United States Patent
Winer et al.

(10) Patent No.: US 11,616,904 B2
(45) Date of Patent: *Mar. 28, 2023

(54) USER INTERFACES FOR ELECTRONIC DEVICES

(71) Applicant: Intel Corporation, Santa Clara, CA (US)

(72) Inventors: Peter W. Winer, Los Altos, CA (US); Krishna Kaza, Santa Clara, CA (US); Russell Scott Love, Palo Alto, CA (US); Jim Granger, Larkspur, CA (US); Jeff Solari, San Francisco, CA (US); Edwin Van Dalen, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,638

(22) Filed: Jul. 7, 2021

(65) Prior Publication Data

US 2021/0409590 A1 Dec. 30, 2021

Related U.S. Application Data

(63) Continuation of application No. 16/844,410, filed on Apr. 9, 2020, now Pat. No. 11,064,106, which is a (Continued)

(51) Int. Cl.
*H04N 5/232* (2006.01)
*H04N 5/77* (2006.01)

(52) U.S. Cl.
CPC ..... *H04N 5/23216* (2013.01); *H04N 5/23218* (2018.08); *H04N 5/23219* (2013.01);
(Continued)

(58) Field of Classification Search
CPC .......... H04N 1/00442; H04N 1/00448; H04N 1/00445; H04N 1/00411; H04N 5/232923
(Continued)

(56) References Cited

U.S. PATENT DOCUMENTS 9,888,166 B2 * 2/2018 Winer ............... H04N 5/23218
11,064,106 B2 7/2021 Winer et al.
(Continued)

FOREIGN PATENT DOCUMENTS

CN 101341734 1/2009
CN 101459769 6/2009
(Continued)

OTHER PUBLICATIONS

China National Intellectual Property Administration, "Second Office Action," mailed in connection with Chinese Patent Application No. 201180076012.7, dated Jun. 5, 2017, 47 pages.
(Continued)

*Primary Examiner* — Christopher K Peterson
(74) *Attorney, Agent, or Firm* — Hanley, Flight & Zimmerman, LLC

(57) ABSTRACT

Disclosed herein are electronic device display interface embodiments for controlling a camera and for reviewing images captured in the device from the camera. For example, in some embodiments, a device is provided with a display for viewing images to be captured by the camera and to provide a display interface for controlling camera operation, wherein the display interface, when in an image capture mode, is to provide an image capture button with two or more smaller image mode buttons disposed adjacent to the image capture button.

12 Claims, 4 Drawing Sheets

Related U.S. Application Data continuation of application No. 15/888,824, filed on Feb. 5, 2018, now abandoned, which is a continuation of application No. 13/977,646, filed as application No. PCT/US2011/068201 on Dec. 30, 2011, now Pat. No. 9,888,166.

(52) U.S. Cl.
CPC ..... *H04N 5/23245* (2013.01); *H04N 5/23293* (2013.01); *H04N 5/232933* (2018.08); *H04N 5/232945* (2018.08); *H04N 5/772* (2013.01)

(58) Field of Classification Search
USPC ........................................ 348/333.01–333.13
See application file for complete search history.

(56) References Cited

U.S. PATENT DOCUMENTS

| | | | |
|---|---|---|---|
| 2003/0164890 | A1 | 9/2003 | Ejima et al. |
| 2003/0189647 | A1 | 10/2003 | Kang |
| 2005/0046718 | A1 | 3/2005 | Yourlo et al. |
| 2006/0050151 | A1 | 3/2006 | Fujinawa |
| 2006/0104628 | A1 | 5/2006 | Hasegawa et al. |
| 2007/0035616 | A1 | 2/2007 | Lee et al. |
| 2008/0205869 | A1 | 8/2008 | Nose |
| 2009/0023472 | A1 | 1/2009 | Yoo et al. |
| 2009/0309990 | A1 | 12/2009 | Levoy et al. |
| 2010/0245287 | A1 | 9/2010 | Thorn |
| 2010/0302409 | A1 | 12/2010 | Matas et al. |
| 2011/0050726 | A1 | 3/2011 | Suehiro |
| 2011/0111769 | A1 | 5/2011 | Yeon |
| 2011/0303956 | A1 | 12/2011 | Cheon et al. |
| 2012/0040644 | A1 | 2/2012 | Naik et al. |
| 2012/0198386 | A1* | 8/2012 | Hautala ............... G06F 3/0481 715/838 |
| 2012/0229411 | A1* | 9/2012 | Arai .................... G06F 3/0486 345/173 |
| 2012/0254716 | A1 | 10/2012 | Choi et al. |
| 2012/0307126 | A1 | 12/2012 | Bhogal |
| 2013/0057713 | A1* | 3/2013 | Khawand ........... H04N 5/23248 348/208.1 |
| 2013/0127911 | A1 | 5/2013 | Brown |
| 2014/0226053 | A1 | 8/2014 | Winer et al. |
| 2018/0352145 | A1 | 12/2018 | Winer et al. |

FOREIGN PATENT DOCUMENTS

| | | |
|---|---|---|
| CN | 101605178 | 12/2009 |
| CN | 101796542 | 8/2010 |
| CN | 102027740 | 4/2011 |
| CN | 102270035 | 12/2011 |
| CN | 102498725 | 6/2012 |
| CN | 103999446 | 8/2014 |
| DE | 202007018421 | 6/2008 |
| DE | 112011106063 | 11/2014 |
| KR | 20060108942 | 10/2006 |
| WO | 9903264 | 1/1999 |
| WO | 2011067890 | 6/2011 |
| WO | 2013101211 | 7/2013 |

OTHER PUBLICATIONS

China National Intellectual Property Administration, "Decision of Rejection," mailed in connection with Chinese Patent Application No. 201180076012.7, dated Oct. 25, 2017, 28 pages.

International Searching Authority, "International Search Report and Written Opinion," mailed in connection with International Patent Application No. PCT/US2011/068201, dated Sep. 14, 2012, 9 pages.

International Bureau, "International Preliminary Report on Patentability," mailed in connection with International Patent Application No. PCT/US2011/068201, dated Jul. 10, 2014, 6 pages.

China National Intellectual Property Administration, "First Office Action," mailed in connection with Chinese Patent Application No. 201180076012.7, dated Aug. 31, 2016, 29 pages.

China National Intellectual Property Administration, "Third Office Action," mailed in connection with Chinese Patent Application No. 201180076012.7, dated Apr. 25, 2018, 6 pages.

"Best of MWC 2017: LG G6"—Android Headlines.com, retrieved Jun. 15, 2018, 11 pages. Retrieved from androidheadlines.com/2017/03/best-of-mwc-2017-lg-g6.html.

Zepeda, "Teardown of LG G6 Reveals its Complicated Internal Components," Mar. 7, 2017, 8 pages. Retrieved from technobuffalo.com/2017/03/07/teardown-of-lg-g6-reveals-its-complicated-internal-components/.

China National Intellectual Property Administration, "Notification to Grant Patent Right for Invention," mailed in connection with Chinese Patent Application No. 201180076012.7, dated Sep. 20, 2018, 4 pages.

"Teardown-LG G6 (LGM_G6002)," 2 pages. Retrieved Jul. 11, 2018, from www.researchandmarkets.com/research/fzn5zb/teardown_lg_g6.

German Patent and Trademark Office, "Office Action," mailed in connection with German Patent Application No. 11 2011 106 063.7, dated Jul. 11, 2019, 23 pages.

United States Patent and Trademark Office, "Non-final Office Action," mailed in connection with U.S. Appl. No. 15/888,824, dated Feb. 12, 2019, 6 pages.

German Patent and Trademark Office, "Office Action," mailed in connection with German Patent Application No. 11 2011 106 063.7, dated Aug. 31, 2020, 10 pages.

Sony Ericsson "Mobile Communications AB: XPERIA X10—Ausführliche Bedienungsanleitung," London, 2010, 102 pages. Retrieved from https://www.handydeutschland.de/bedienungsanleitung/sony_ericsson_xperia_x10.pdf.

National Intellectual Property Administration of China, "Office Action," mailed in connection with Chinese Patent Application No. 201810154990.2, dated Sep. 3, 2020, 22 pages.

German Patent and Trademark Office, "Decision to Grant," mailed in connection with German Patent Application No. 11 2011 106 063.7, dated Mar. 8, 2021, 15 pages.

National Intellectual Property Administration of China, "Second Office Action," mailed in connection with Chinese Patent Application No. 201810154990.2, dated Apr. 15, 2021, 35 pages.

National Intellectual Property Administration of China, "Third Office Action," mailed in connection with Chinese Patent Application No. 201810154990.2, dated Sep. 23, 2021, 3 pages.

United States Patent and Trademark Office, "Notice of Allowance," mailed in connection with U.S. Appl. No. 16/844,410 dated Mar. 10, 2021, 10 pages.

United States Patent and Trademark Office, "Corrected Notice of Allowability," mailed in connection with U.S. Appl. No. 16/844,410 dated Apr. 5, 2021, 6 pages.

United States Patent and Trademark Office, "Corrected Notice of Allowability," mailed in connection with U.S. Appl. No. 16/844,410 dated Jun. 17, 2021, 6 pages.

United States Patent and Trademark Office, "Non-final Office Action," mailed in connection with U.S. Appl. No. 15/167,803 dated Nov. 15, 2017, 17 pages.

United States Patent and Trademark Office, "Non-final Office Action," mailed in connection with U.S. Appl. No. 13/977,646 dated Mar. 13, 2015, 15 pages.

United States Patent and Trademark Office, "Final Office Action," mailed in connection with U.S. Appl. No. 13/977,646 dated Sep. 1, 2015, 16 pages.

United States Patent and Trademark Office, "Non-final Office Action," mailed in connection with U.S. Appl. No. 13/977,646 dated Jun. 22, 2016, 15 pages.

United States Patent and Trademark Office, "Final Office Action," mailed in connection with U.S. Appl. No. 13/977,646 dated Nov. 23, 2016, 17 pages.

United States Patent and Trademark Office, "Notice of Allowance," mailed in connection with U.S. Appl. No. 13/977,646 dated Nov. 20, 2017, 18 pages.

(56) References Cited

OTHER PUBLICATIONS

United States Patent and Trademark Office, "Corrected Notice of Allowability," mailed in connection with U.S. Appl. No. 13/977,646 dated Jan. 8, 2018, 5 pages.

United States Patent and Trademark Office, "Final Office Action," mailed in connection with U.S. Appl. No. 15/888,824 dated Oct. 9, 2019, 9 pages.

United States Patent and Trademark Office, "Advisory Action," mailed in connection with U.S. Appl. No. 13/977,646 dated Nov. 17, 2015, 4 pages.

China National Intellectual Property Administration, "Notification To Go Through Formalities of Registration," mailed in connection with Chinese Patent Application No. 201810154990.2, dated Feb. 11, 2022, 7 pages.

\* cited by examiner

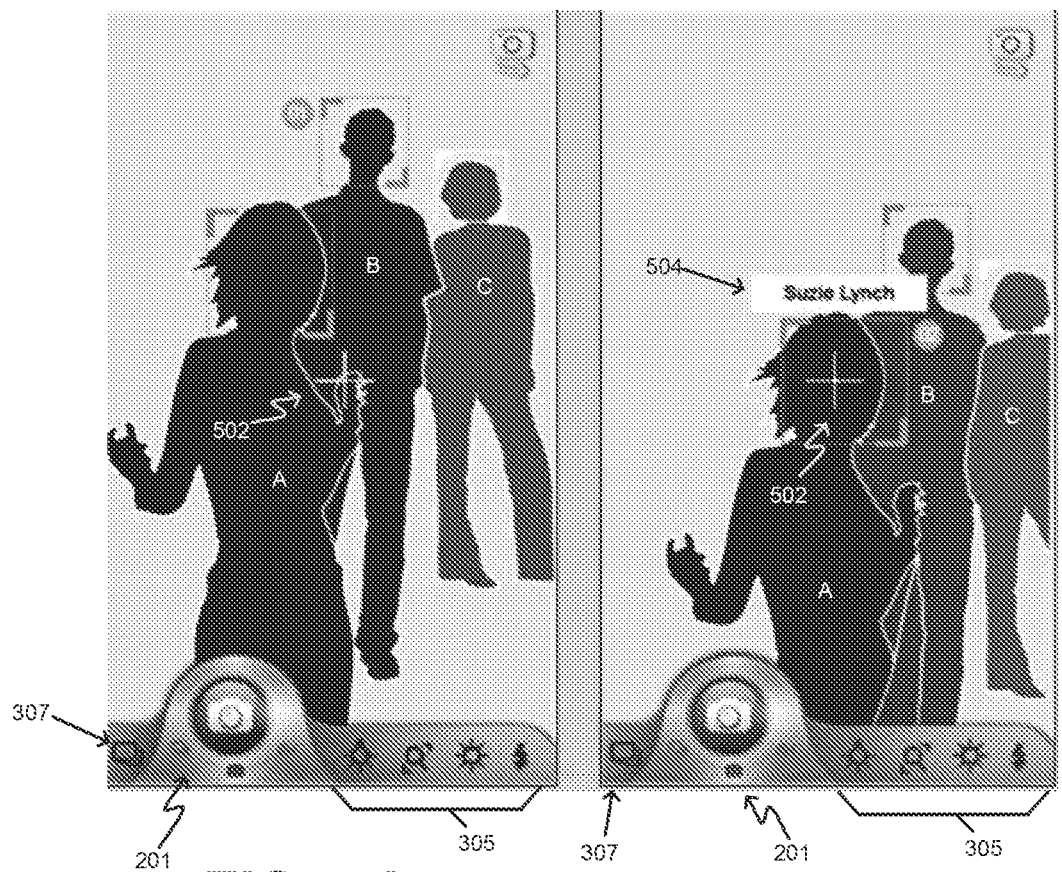
FIG. 5A  FIG. 5B
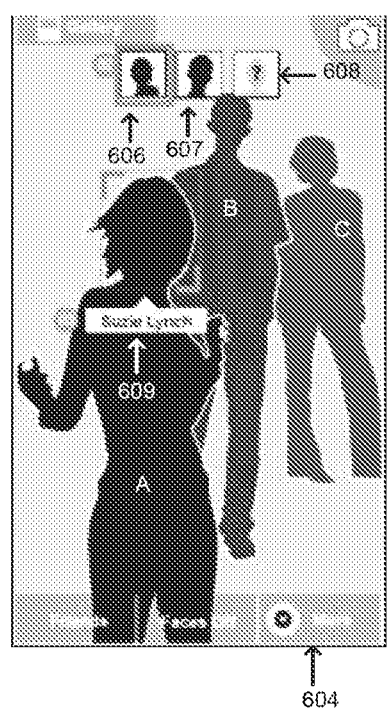
FIG. 6

USER INTERFACES FOR ELECTRONIC DEVICES

CROSS-REFERENCE TO RELATED APPLICATIONS

This patent arises from a continuation of U.S. patent application Ser. No. 16/844,410, filed Apr. 9, 2020, entitled "USER INTERFACES FOR ELECTRONIC DEVICES," which is a continuation of U.S. patent application Ser. No. 15/888,824, filed Feb. 5, 2018, entitled "USER INTERFACES FOR ELECTRONIC DEVICES," which is a continuation of U.S. patent application Ser. No. 13/977,646 (now U.S. Pat. No. 9,888,166), filed Jun. 28, 2013, entitled "USER INTERFACES FOR ELECTRONIC DEVICES," which is a U.S. national stage entry of International Patent Application No. PCT/US2011/068201, filed Dec. 30, 2011, entitled "USER INTERFACES FOR ELECTRONIC DEVICES." U.S. patent application Ser. No. 16/844,410, U.S. patent application Ser. No. 15/888,824, U.S. patent application Ser. No. 13/977,646, and International Patent Application No. PCT/US2011/068201 are hereby incorporated by reference. Priority to U.S. patent application Ser. No. 16/844,410, U.S. patent application Ser. No. 15/888,824, U.S. patent application Ser. No. 13/977,646, and International Patent Application No. PCT/US2011/068201 is hereby claimed.

TECHNICAL FIELD

Embodiments of the present invention relate generally to electronic device user interfaces, and in particular, to user interfaces for camera systems in a handheld wireless device.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 5A and 5B show a portion of a user interface screen display highlighting a face recognition feature for an image capture mode for the device of FIG. 1 in accordance with some embodiments.

FIG. 6 shows a portion of a user interface screen display highlighting a face recognition feature for an image file review mode for the device of FIG. 1 in accordance with some embodiments.

DETAILED DESCRIPTION

With different embodiments, electronic devices having image (still image, video, etc.) capture functionality are provided with user interfaces having one or more innovative user interface (UI) features disclosed herein. Electronic devices could include smart phones, tablet computers or any other portable wireless devices with image capture functionality that is to be controlled through a user display interface.

Figure 1:
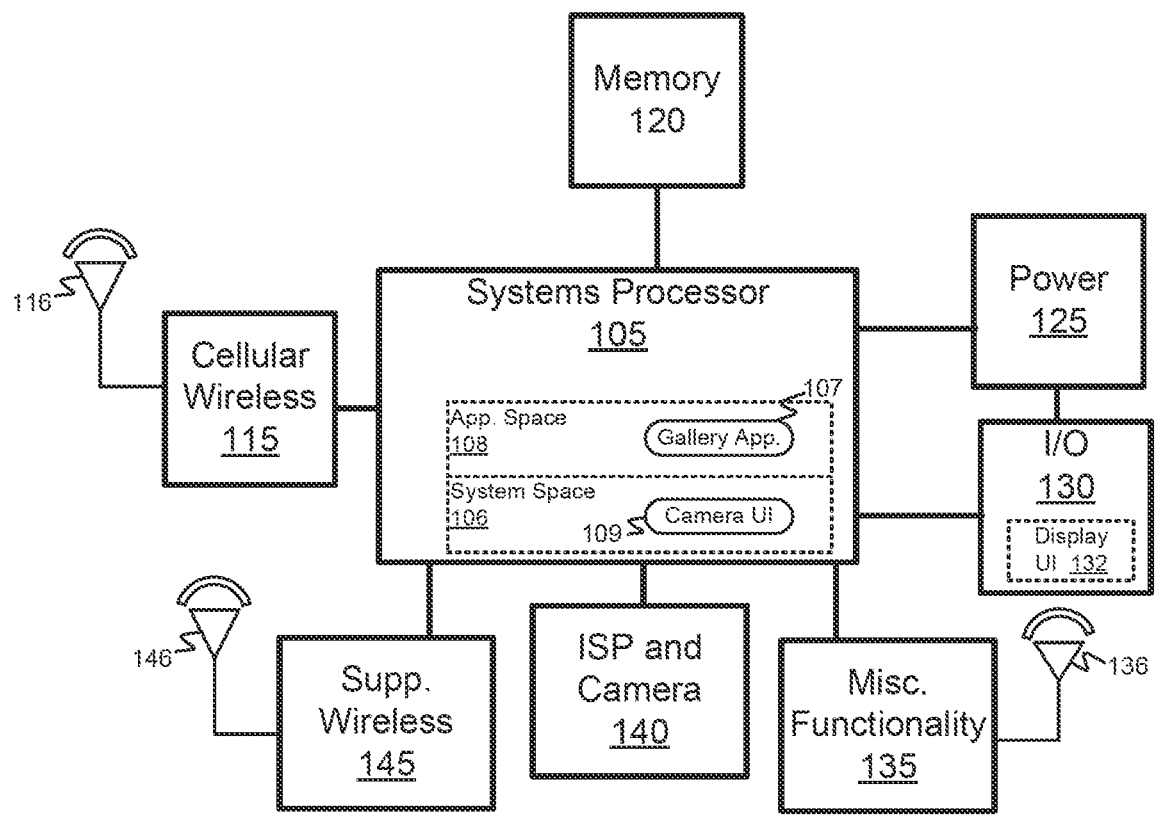
FIG. 1 is a block diagram of a an electronic device in accordance with some embodiments.

FIG. 1 is a block diagram for an embodiment of an electronic device (e.g., smart phone, tablet) with a user interface display in accordance with embodiments disclosed herein. It comprises a system processor 105, a cellular wireless block 115, memory 120, a power block 125, an I/O block 130, miscellaneous functionality 135, ISP and camera block 140, and supplemental wireless block 145, coupled together as shown. These "blocks" may be group abstractions, logical groupings corresponding to different circuits on one or more different components, or they may correspond to separate physical structures or a combination thereof.

The system processor 105 includes core logic for implementing system space 106 and application space 108. System space may include an operating system, with drivers and other components, such as Android™, Windows Mobile, Symbian, Linux, Apple's OS X, and the like, for managing the electronic device platform's hardware and software resources. The application space includes various different higher level applications for performing tasks on the platform. it could include applications for running/managing different device functions, as well as loadable "apps" for performing a desired user task or function.

In the depicted embodiment, the system space includes a camera UI module, and the application space includes a gallery application. The camera UI facilitates a user interface to enable a user to control camera operation. This may include controlling camera (image capture) modes, whether or not the device is in a image capture mode or another mode such as a gallery mode, and/or operation of the device in a given mode. The gallery application allows a user to manage an image once it has been captured. (It should be appreciated that the different camera UI components and/or other modules or applications affecting camera operability may be in various combinations of the system space, application space, and/or elsewhere.)

Memory 120 is coupled to the processor 105 to provide system memory. It may include SDRAM and non-volatile memory such as NAND flash memory. The power block 125 comprises a power source such as one or more batteries, energy harvesting hardware, and/or voltage regulators for providing one or more suitable supplies. It may also include one or more appropriate interfaces (e.g., USB, conventional DC adapter) for charging the one or more batteries. In addition, it may include a power management unit to control power states for at least some of the various different device elements and to manage the power supply sources such as the one or more batteries.

I/O block 130 generally comprises I/O components including I/O ports, user control devices, and at least one display (e.g., a resistive or capacitive based LCD touch screen). In some embodiments, at least one of the one or more displays facilitates a display user interface 132, for, among other things, to allow a user to control on-board image capture operation through a camera in the electronic device.

The miscellaneous functionality block 135 may include any components for providing functionality for the electronic device. Such components could include, for example, a GPS module (with antenna 136), audio codec, a video codec, and sensors such as accelerometers and gyros for position and/or motion sensing.

The ISP and camera block 140 includes an image signal processor (ISP) and a camera for capturing image (still images, video, etc.). In this depiction, the ISP and camera are grouped together in a common block for discussion purposes, with particular relevance to this disclosure, but of course, they could actually be in different areas. In some embodiments, the camera may be implemented using conventional CMOS or CCD image sensors, with appropriate supporting circuitry. The camera will typically have a lens, mounted within the electronic device so that the user can readily view the display UI while pointing the camera lens at a desired target. For example, with some smart phone or tablet embodiments having planer surfaces on oppositely facing sides, the camera lens may be on one side, while the display interface for controlling the camera may be on the other side.

The cellular wireless block, along with an included antenna 116, corresponds to the circuits needed to provide cellular telecommunication (e.g., 3G, 4G and beyond) access for the electronic device. it could include a power amplifier, transceiver, baseband processor, mobile memory (NOR flash), etc. The alternative wireless block 145, along with associated antenna 146, encompasses other wireless interface components, including, for example, WiFi, Bluetooth, and the like.

Figure 2:
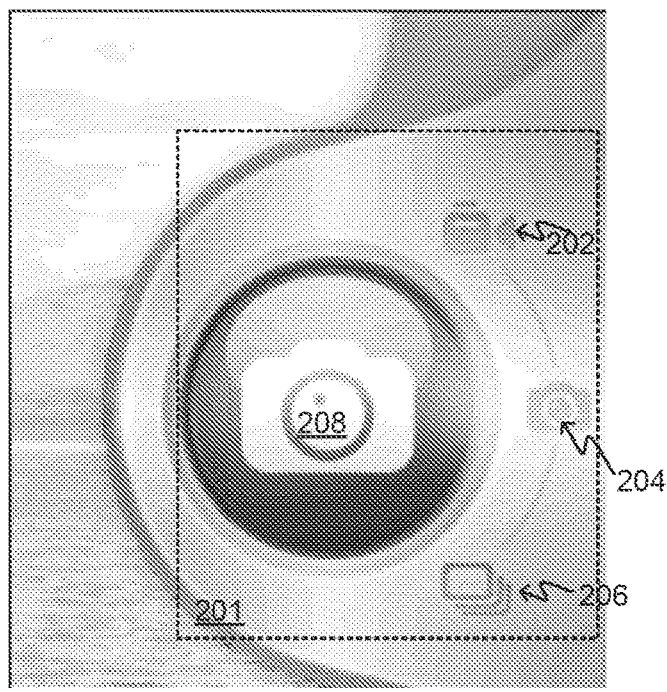
FIG. 2 is a drawing of a portion of a user interface screen display for controlling image capture functionality in the device of FIG. 1 in accordance with some embodiments.

FIG. 2 shows a image capture interface portion 201 that enables a user to conveniently switch between different image capture modes (still images, video, etc.) while capturing an image. In the depicted embodiment, image capture interface 201 comprises a image capture button 208, along with three image capture mode buttons: video mode 202, still mode 204, and burst mode 206. With other embodiments, different combinations with more or less image capture modes could be employed. For example, panorama and HDR (high dynamic range) modes could be added to the three modes displayed in FIG. 2. (Note that with these buttons, and others discussed herein, the "buttons" are touch and/or gesture sensitive areas on a view screen implementing the UI display for image capture functionality on a wireless device.)

The image capture button 208 controls the generation of image files within the different modes. The image mode buttons (202, 204, 206), when pressed, cause the selected image capture mode to be entered. Video mode results in a video file being captured. When in video mode, an initial depression of the image capture button causes the video file to start capturing video information. it does this continually until the image capture button 208 is depressed again, ending the video file.

When in still image mode (upon mode button 204 being pressed), a single "still" frame is generated when the image capture button is pressed. In some embodiments, a single, push of the button is required for an image to be captured. In other embodiments, a pre focus feature could be implemented, whereby, for example, a first press could cause automatic settings (focus, brightness, exposure, etc.) to be made for the image, while a second push could cause the still image file to be captured.

Burst mode allows for a series of still image frames to be generated sequentially. The user presses the burst mode button 206 to enter into burst mode. An initial push of the image capture button causes the sequence to begin, whereby frames are captured, for example, at a rate of 15 frames per second, until button 208 is again pressed to halt the burst capture.

The depicted image capture interface 201 provides an intuitive, discoverable solution for both switching between image modes and capturing images. With the mode buttons disposed radially about the image capture button, and thus each being next to it, on-screen buttons for changing capture modes and for capturing image are combined into a convenient, unified, user control interface that can be operated entirely with gestures. Moreover, it can be readily operated simply by using one's thumb, to capture image and switch between modes, "on the fly" if desired, as the electronic device is held using a single hand.

Figure 3:
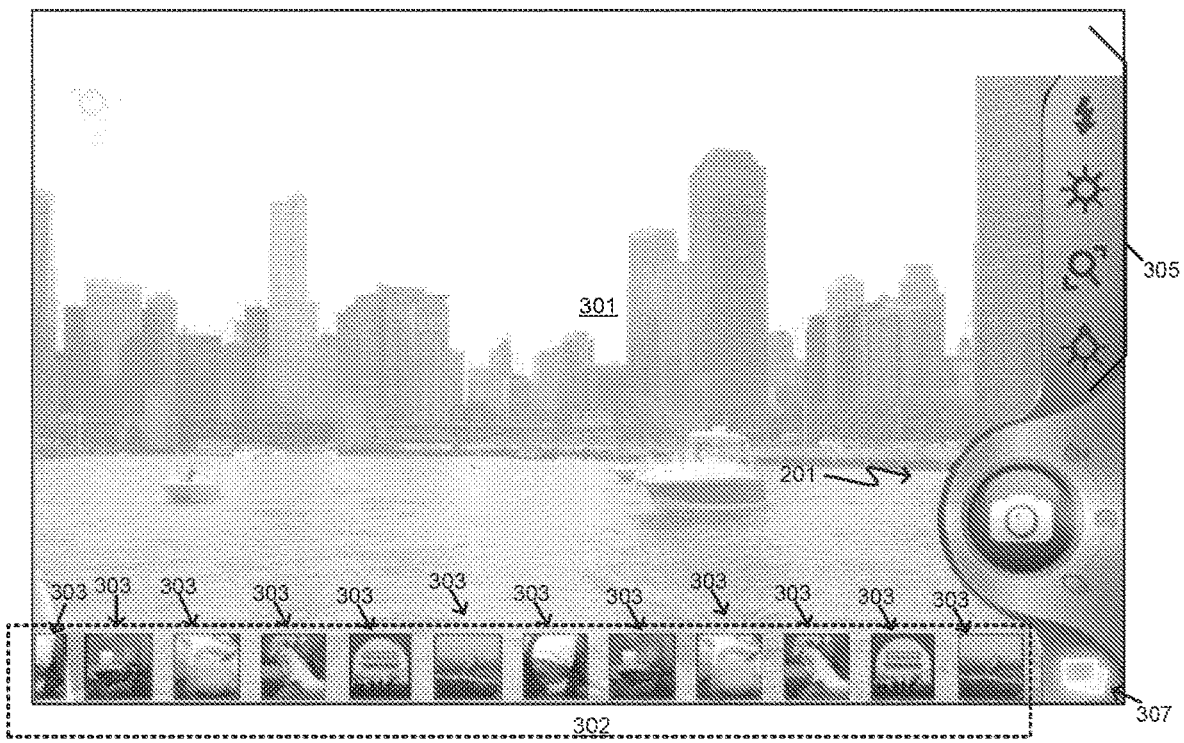
FIG. 3 shows a portion of a user interface screen display with a thumbnail gallery ribbon for the device of FIG. 1 in accordance with some embodiments.

FIG. 3 shows a portion of a display interface having a gallery ribbon with the camera feature being in, for example, a video or still mode. The depicted display interface, along with the image capture interface portion 201, includes a gallery ribbon panel (or gallery ribbon or thumbnail summary panel) 302 and camera settings interface 305. The camera settings interface 305 includes, from top to bottom, flash, brightness, zoom, and effects buttons. Depending on which part of a settings button is pressed, its level may be increased or decreased. There is also a button 307 for displaying or hiding the gallery ribbon panel.

Cameras, in smart phones or tablets, for example, are typically not well-integrated with gallery applications. (A gallery application is an application in an electronic device used for reviewing, viewing, editing, organizing, etc., image and/or video files. Typically, in a portable device with a camera, the active image capture mode is separate from, and usually not active during, a gallery mode.) Thus, it is not easy for a user to capture images and then review them while capturing more images. It is typically necessary to switch back and forth between the camera application and the gallery application.

The gallery ribbon 302 functions to address this issue. The gallery ribbon panel 302 includes a series of thumbnail pictures that are being captured in a given image capture session. In some embodiments, when a session is started (e.g., the electronic device is powered up or the camera functionality is activated) when the first file (still picture or video clip) has been captured, its thumbnail is generated and displayed on the right side of panel 302. From here, the next generated file causes its thumbnail to "come out", be displayed at the far right of the panel and shift the previously created thumbnail one position to the left. This continues until the ribbon is full and the oldest thumbnail reaches the far left boundary of the panel, and then eventually disappears. In effect, a series of thumbnails are scrolled to the left of the panel 302, with the oldest one on the far left and the newest one on the far right. The gallery ribbon is convenient because it allows a user to see, in real time and on the same screen as a target image, images or video clips that have already been captured as the user is capturing new images.

So, in operation, when the gallery ribbon is activated and the user is capturing new media files, a gallery ribbon moves across the bottom of the screen, showing the most recent captured image from the camera. This can include still images, videos and collections from burst capture.

In some embodiments, when the user clicks a picture in the ribbon, a large version is presented, occupying most of the screen. This gives the user the ability to easily review a captured image and decide if they got the correct shot. It's done within the camera application, so the user can press the capture button 208 again to quickly capture another image.

Figure 4:
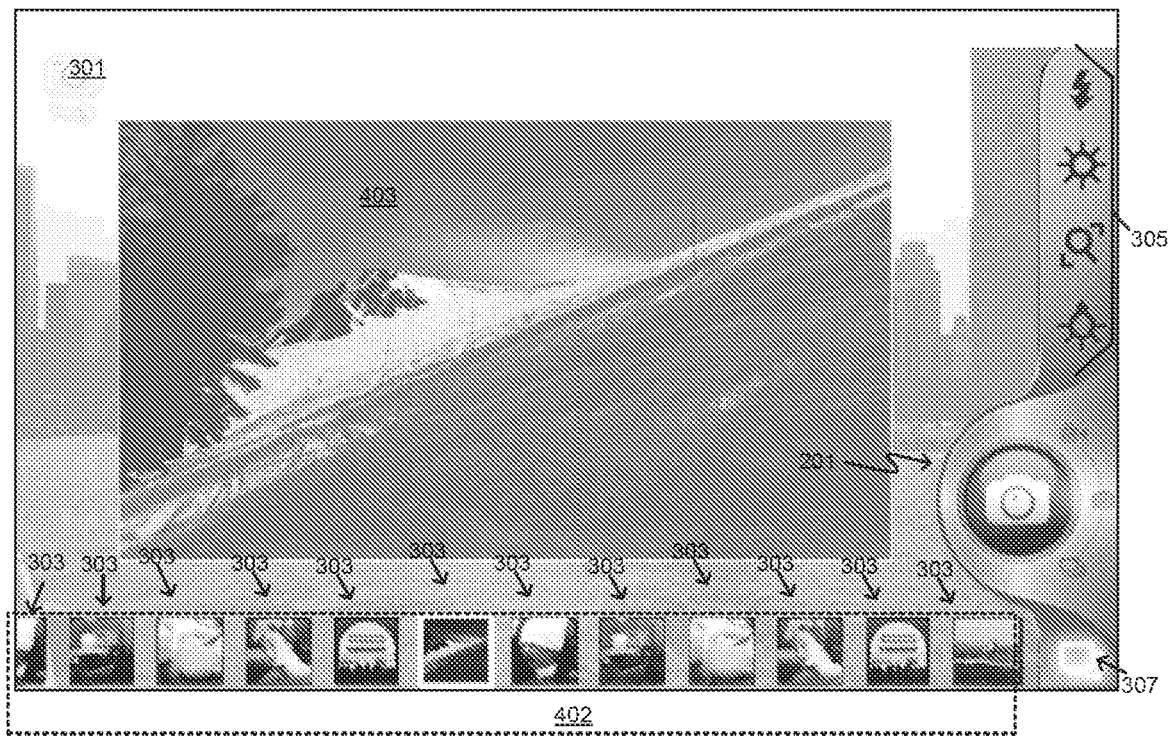
FIG. 4 shows a portion of a user interface screen display, suitable for the device of FIG. 1, in a burst mode having a thumbnail gallery ribbon in accordance with some embodiments.

FIG. 4 shows a display interface, with a gallery ribbon, when the camera is in a burst mode. The gallery ribbon thumbnails 301 show the different images from a burst capture sequence. One of these thumbnails has been depressed, making it appear in a larger form 403 on the image display area 301.

In this embodiment, the Ribbon across the bottom of the screen shows the collection of images captured from a burst.

Unlike with still and video modes, in burst mode, the gallery ribbon appears without having to activate it. As with the gallery ribbon in video and still image modes, when the first image is captured, it is displayed alone at the extreme right edge of the ribbon. Capturing the second image causes the first image to slide left. The second image replaces the first image in the right-most position. As further images are captured, the ribbon extends to the left like a stack. When the ribbon fills the width of the screen, images keep sliding or 'scrolling' across the screen bottom.

FIGS. 5A and 5B show the image display area 301, in an image capture mode when one or more person's faces are recognized. Face detection (FU) technology is used to identify faces in images, while face recognition (FR) technology associates a face with a named individual. Any suitable face recognition/detection software could be used. For example, Face software from Olaworks™ may be employed.

This feature shows how the camera application can be used to recognize faces as a user aims the camera at a subject. In the depicted figure, three faces from persons A, B, and C, are detected, but only faces from two of these persons (A, B) are recognized. This is indicated by the fact that person C has a lighter shading and persons A and B have box corners around their faces. In the left picture, no person is highlighted and named, because the none of the persons is sufficiently centered, in the cross-hairs of the image. In the image on the right side, however, the user has aimed the camera at the front-most person, who is now in the cross-hairs. That face is highlighted (at 504) with the person's name ("Suzie Lynch").

In some embodiments, the electronic device has an on-board database (e.g., implemented in memory 120 or elsewhere) containing face detection data for faces that have already been detected and named by the user. For example, in a gallery mode (with an executing gallery application for viewing/editing pictures), a user, in bringing up a photo, could inform the application that a certain face is that of a person who they name, and possibly provide other information, e.g., social media and other contact information. The face recognition module, in image capture mode, can then associate the recognized face of person A, in real time, against stored face data in the database, and determine that it is that of "Suzie Lynch."

FIG. 6 shows the display when in a gallery mode, as opposed to being in an image capture mode. In this figure, a photo from the previous figure (showing the three persons: A, B, and C) is selected for the gallery application. In this embodiment, the set of faces is displayed in a collection (606-608) at the top of the screen. A user can click on a face in this collection to highlight it. When a face is highlighted, a user can click a "friends menu" button 605 and manage information associated with the face, including the person's name (605) and other contact information, as well as image edit attributes, possibly to be applied to that person as a default when the person is recognized in an image.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An electronic device, comprising:
  a camera;
  a touchscreen;
  memory;
  machine readable instructions; and
  processor circuitry to execute the machine readable instructions to at least:
    render a first icon that, when selected, is to cause the camera to capture an image;
    render second and third icons radially to the first icon, the second icon to, when selected with a first gesture, cause the camera to capture a burst of two or more images and the third icon to, when selected with a second gesture, cause the camera to capture video;
    when the first icon is selected at a first time, cause the touchscreen to display a first thumbnail corresponding to a first image captured by the camera at the first time, the first thumbnail located in a first position of the touchscreen; and when the first icon is selected at a second time after the first time, cause the touchscreen to display a second thumbnail corresponding to a second image captured by the camera at the second time, the second thumbnail to occupy the first position of the touchscreen and the first thumbnail to be shifted to a second position of the touchscreen.

2. The electronic device as defined in claim 1, wherein the processor circuitry is to orient the first position adjacent to the second position on the touchscreen.

3. The electronic device as defined in claim 1, wherein the processor circuitry is to cause the first position of the touchscreen and the second position of the touchscreen to be displayed in a thumbnail region of the touchscreen, the thumbnail region including a threshold quantity of positions in addition to the first position and the second position.

4. The electronic device as defined in claim 3, wherein the processor circuitry is to remove an image located at a position of the thumbnail region corresponding to the threshold quantity of positions when a subsequent image is captured by the camera.

5. The electronic device as defined in claim 4, wherein the image located at the position of the thumbnail region corresponding to the threshold quantity of positions is an oldest image and the subsequent image is a newest image.

6. The electronic device as defined in claim 1, wherein the electronic device is a wireless telephone.

7. An electronic device, comprising:
means for capturing images;
means for interacting with the smartphone;
means for storing; and
means for executing instructions to:
render a first selected icon to cause the means for capturing images to capture an image;
render a second icon and a third icon, the second and third icons rendered in a radial orientation with respect to the first icon;
when the second icon is selected via a first gesture, cause the means for capturing images to capture a burst of two or more images;
when the third icon is selected via a second gesture, cause the means for capturing images to capture video;
cause the means for interacting to display a first thumbnail corresponding to a first image captured by the means for capturing images at a first time, the first thumbnail located in a first position of the means for interacting; and
cause the means for interacting to display a second thumbnail corresponding to a second image captured by the means for capturing images at a second time, the second thumbnail to occupy the first position of the means for interacting and the first thumbnail to be shifted to a second position of the means for interacting.

8. The electronic device as defined in claim 7, wherein the means for executing instructions is to cause the first position to be oriented adjacent to the second position on the means for interacting.

9. The electronic device as defined in claim 7, wherein the means for executing instructions is to cause the first position of the means for interacting and the second position of the means for interacting to be displayed in a thumbnail region of the means for interacting, the thumbnail region including a threshold quantity of positions in addition to the first position and the second position.

10. The electronic device as defined in claim 9, wherein the means for executing instructions is to remove an image located at a position of the thumbnail region corresponding to the threshold quantity of positions when a subsequent image is captured by the means for capturing images.

11. The electronic device as defined in claim 10, wherein the image located at the position of the thumbnail region corresponding to the threshold quantity of positions is an oldest image and the subsequent image is a newest image.

12. The electronic device as defined in claim 7, wherein the electronic device is a wireless telephone.

\* \* \* \* \*